(12) United States Patent
Braunstein

(10) Patent No.: US 9,019,436 B2
(45) Date of Patent: Apr. 28, 2015

(54) VIEW PRIORITIZATION FOR MULTI-MACHINE CONTROL VISUALIZATION

(71) Applicant: Caterpillar Inc., Peoria, IL (US)

(72) Inventor: Michael Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 6 days.

(21) Appl. No.: 13/854,429

(22) Filed: Apr. 1, 2013

(65) Prior Publication Data

US 2014/0293137 A1   Oct. 2, 2014

(51) Int. Cl.
*H04N 5/44*  (2011.01)
*H04N 7/18*  (2006.01)
*G06Q 10/06* (2012.01)
*G06K 9/00*  (2006.01)

(52) U.S. Cl.
CPC ............ *H04N 5/4403* (2013.01); *H04N 7/181* (2013.01); *G06Q 10/06* (2013.01); *G06K 9/00* (2013.01)

(58) Field of Classification Search
CPC ...... H04N 5/4403; H04N 7/181; G06Q 10/06
USPC ................... 348/734, 552, 14.04, 14.05, 114; 340/426.13; 725/133; 715/717
See application file for complete search history.

(56) References Cited

U.S. PATENT DOCUMENTS

| | | | |
|---|---|---|---|
| 5,412,400 A | 5/1995 | Takahara et al. | |
| 7,711,842 B2 | 5/2010 | Liu et al. | |
| 7,898,403 B2 | 3/2011 | Ritter et al. | |
| 8,125,310 B2 | 2/2012 | Enkerud et al. | |
| 8,682,673 B2 * | 3/2014 | Gazdzinski | 704/270 |
| 8,701,027 B2 * | 4/2014 | van Dantzich et al. | 715/768 |
| 2002/0054117 A1 | 5/2002 | van Dantzich et al. | |

* cited by examiner

*Primary Examiner* — Jefferey Harold
*Assistant Examiner* — Jean W Desir
(74) *Attorney, Agent, or Firm* — Miller, Matthias & Hull LLP

(57) ABSTRACT

A method and system for providing remote vision to a remote operator with respect to a plurality of machines includes a remote vision system with one or more display screens and a receiver for receiving video information and machine information from each of the one or more machines. A controller console is linked to the remote vision system and the receiver, and is configured to calculate a priority ranking of the plurality of machines based on the received machine data and to display the video information from each machine as one or more video displays on a display screen wherein at least one of the one or more video displays is modified in appearance and/or position or duration of placement based on the priority ranking.

20 Claims, 8 Drawing Sheets

VIEW PRIORITIZATION FOR MULTI-MACHINE CONTROL VISUALIZATION

TECHNICAL FIELD OF THE DISCLOSURE

The present disclosure relates to the remote control and remote monitoring of earth-moving machines and, more particularly, relates to a system and method for adaptively prioritizing video presentation to provide an alert to a remote operator.

BACKGROUND OF THE DISCLOSURE

Many industrial activities require the use of earth moving machines, material lifting and handling machines, and other large machines. In order to enhance operator safety and productivity while reducing operator fatigue, the operation of such machines is increasingly automated and/or executed via remote control (RC). In this way, an operator may monitor and control a machine from the safety and quiet of an operator center rather than spending the work day in the cab of the machine itself.

It is possible for a single operator to monitor multiple remote machines at once via a remote vision system that displays video from each machine to the operator at a remote operator center. Such systems allow for more efficient monitoring due to consolidation of video information in a single location. However, the amount of data available from any one machine is such that for a large number of machines, an operator may be challenged to quickly identify video displays that represent a higher priority for monitoring and/or control.

One attempt to prioritize machine information entails limiting the visual display to a simpler form, e.g., icons rather than video. For example, U.S. Pat. No. 7,898,403, entitled "Detecting construction equipment process failure" (Ritter et al.) describes a system wherein icons are displayed to an operator to represent various machines, and the icons are color-coded to represent various degrees of urgency. See '403 patent at col. 26, ll. 20-44 ("The client 1210's display 1220 can be used for displaying a visual representation of a construction site and visual representations of the assets that are being used on that construction site. The visual representation of the construction site may be a map of the construction site. The visual representations of assets may be icons . . . . For example a visual representation of a service truck may look like a service truck . . . . [T]he visual representation of an asset may change colors in order to display status information 1252 about that asset . . . [T]he color of the entire visual representation may be changed or a part of the visual representation may be changed.")

However, in the context of remote machine control, and of remote vision systems for such remote control, systems like that of the '403 patent, by virtue of their imprecise presentation, do not provide sufficient information to precisely control a machine. As such, while such a system may convey an alert, it does not allow for precise machine remote control The present disclosure is directed at least in part to a system that may address the needs discussed or implied above. However, it should be appreciated that the solution of any particular problem is not a limitation on the scope of this disclosure nor of the attached claims except to the extent expressly noted. Additionally, the inclusion of material in this Background section is not an indication that the material represents known prior art other than the patent specifically identified above. With respect to such identified prior art, the foregoing characterization is not itself prior art but is simply a brief summary for the sake of reader convenience. The interested reader is referred to the identified patent itself for a more accurate understanding.

SUMMARY OF THE DISCLOSURE

In accordance with one aspect of the present disclosure, a system is disclosed for providing remote vision to a remote operator with respect to a plurality of machines. The system includes a remote vision system with one or more display screens and a receiver for receiving video information and machine information from each of the plurality of machines. A controller console is linked to the remote vision system and the receiver, and is configured to calculate a priority ranking of the plurality of machines based on the received machine data and to display the video information from each machine as one or more video displays on a display screen wherein at least one of the one or more video displays is visually modified based on a priority ranking.

In accordance with another aspect of the present disclosure, a method is disclosed for providing remote vision to an operator of a plurality of machines. Within the method, video data and machine data are received from each of the plurality of machines, and the plurality of machines are prioritized based on the machine data for each machine to create a priority ranking. The received video data is then displayed on a display screen as a plurality of video displays, such that the plurality of video displays are displayed in accordance with the priority ranking.

In accordance with yet another aspect of the present disclosure, a non-transitory computer readable medium is provided having thereon computer-executable instructions for providing remote vision to an operator of a plurality of machines. The instructions include instructions for receiving video data and machine data from each of the plurality of machines, prioritizing the plurality of machines based on the machine data for each machine to create a priority ranking, and displaying the received video data on a display screen as a plurality of video displays, such that the plurality of video displays are displayed in accordance with the priority ranking.

Other features and advantages of the disclosed systems and principles will become apparent from reading the following detailed disclosure in conjunction with the included drawing figures.

DETAILED DESCRIPTION OF THE DISCLOSURE

The present disclosure provides a system and method applicable to earth-moving machines and other industrial machines used in remote control/monitoring applications such as in mining applications wherein it is desired to provide a remote operator with video information regarding controlled and monitored machines. The system and method further provide adaptive real time video control to allow for video display modification based on machine operational parameters such as machine speed, machine location, machine implement operation and machine direction. Modifications to the video display may include, for example, modifying a position of one or more video displays and/or modifying an overlay color, outline color, or display rate for one or more video displays. The modifications so made are configured to enhance operator focus on higher priority video displays, e.g., for machines that are operating in more important locations, zones or modes.

Figure 1:
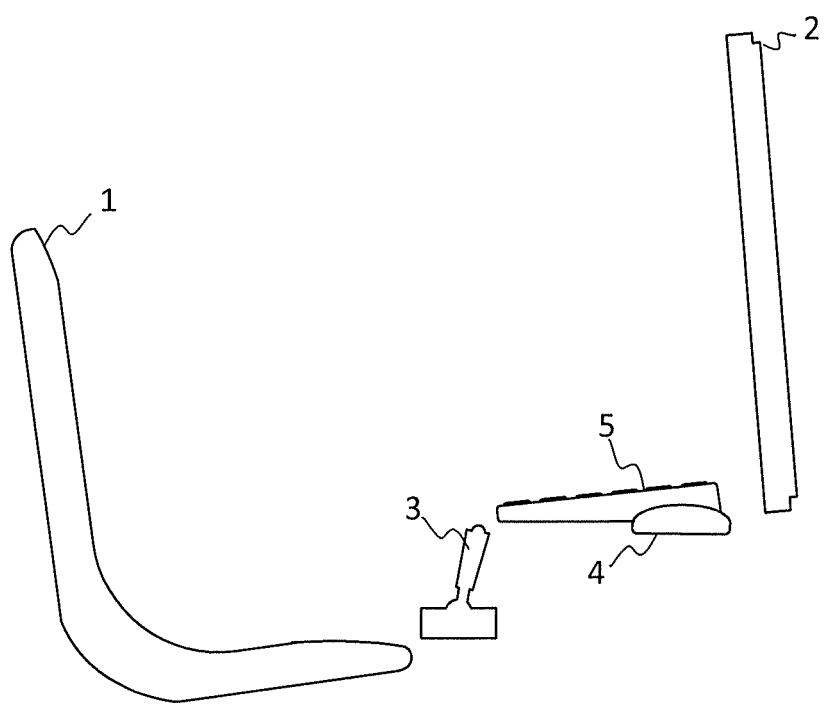
FIG. 1 is a schematic diagram of an operator control station usable to implement aspects of the disclosure.

Having given the above overview and referring now more specifically to the drawing figures, the schematic drawing of FIG. 1 illustrates an operator station with respect to which aspects of the disclosure may be implemented. In the illustrated embodiment, the operator station includes an operator seat 1, located adjacent a number of control and display devices. As shown the display device may be a flat screen display 2 while the control devices may include a joystick 3, a mouse 4 or other pointer device, and a keyboard 5 or other data entry device. The various video feeds are displayed on the flat screen display 2 in the manner described in greater detail below. The various control devices are used by the operator to control a primary machine and to alter the state of the system. For example, the joystick 3 may be used to control the machine while the mouse 4 and keyboard 5 may be used to make or change the primary machine selection, alter system defaults, select various selectable icons on the flat screen display 2 and so on.

Figure 2:
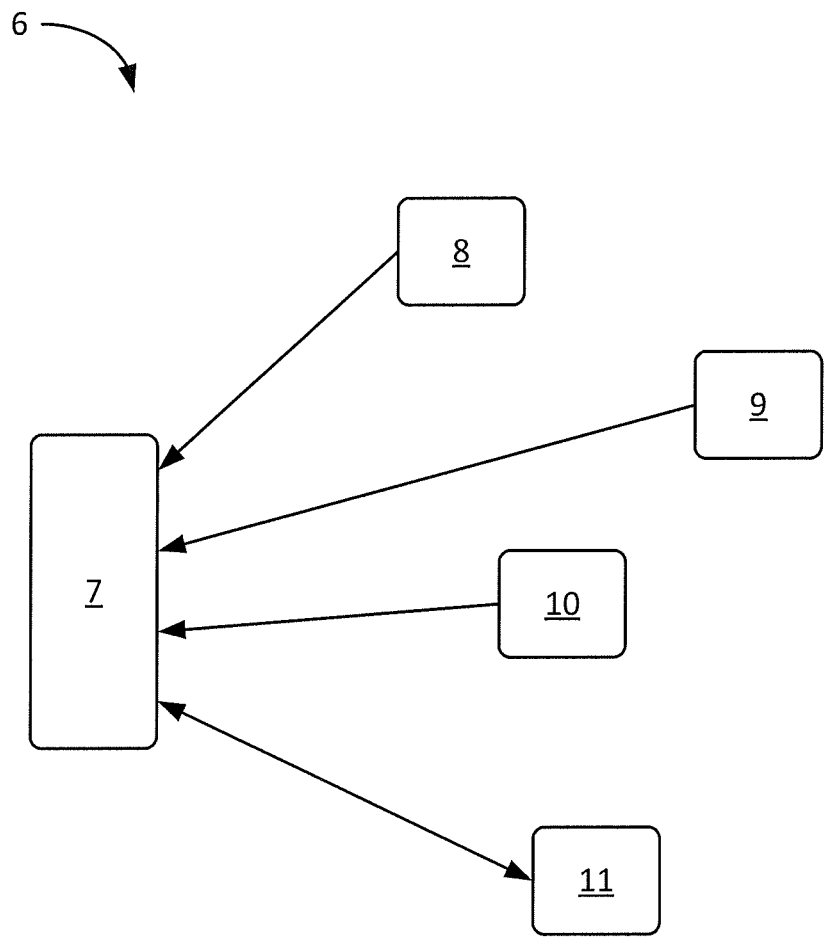
FIG. 2 is a schematic diagram of an RC/autonomous machine control and monitoring architecture in accordance with an aspect of the disclosure.

FIG. 2 is a schematic diagram of a machine control and monitoring system 6 in accordance with an implementation of the disclosed principles. The illustrated control and monitoring system 6 includes an operator center 7, which is a location from which a human operator may control and/or monitor multiple remote machines. The machines in the illustrated example include a first machine 8, a second machine 9, a third machine 10, and a fourth machine 11.

As will be discussed in detail hereinafter, the operator center 7 includes facilities to allow the operator to view, via video, the operation of one or more of the multiple machines, as well as to control one or more machines, as described in reference FIG. 1 above. The communication between the operator center 7 and the multiple machines 8, 9, 10, 11 may be unidirectional or bidirectional. For example, when a machine is being remotely controlled by the operator, the communications from the operator center 7 to the machine in question may contain control information, and returning communications may contain status and video information. For machines not currently being controlled, but instead operating in another manner, e.g., autonomously, the machine may provide status and video information to the operator center 7 without receiving control commands.

In an embodiment, the communications between the operator center 7 and a machine are wireless, and may be direct, as in the case of short range wireless communications technology, or may be indirect, as in the case of cellular or other long range communications technologies. In addition, all or some such communications may be encrypted or encoded for security purposes. For example, encryption of remote control commands may prevent unauthorized third parties from controlling a machine in a dangerous or damaging manner.

Figure 3:
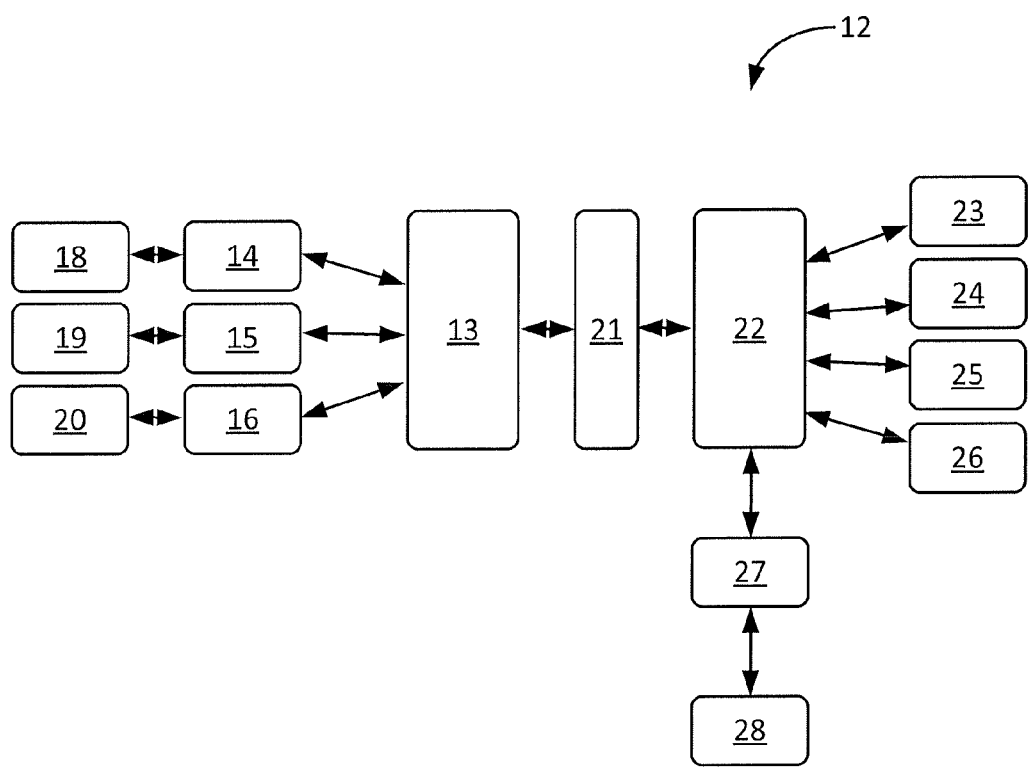
FIG. 3 is a schematic diagram of a machine data and control system in accordance with an aspect of the disclosure.

It will be appreciated that in an implementation of the described architecture, the operator center 7 is adapted for control and monitoring of the various machines 8, 9, 10, 11, while the various machines 8, 9, 10, 11 are configured to communicated with and receive control data from the operator center 7. FIG. 3 is a schematic diagram of a machine data and control system 10 in accordance with an implementation of the disclosed principles. The illustrated machine data and control system 12 includes a controller 13 in communication with multiple inputs and outputs to be described. The controller 13 may be any device that controls the receipt and processing of data obtained from the various inputs while also generating commands and/or data for provision to the various outputs.

The controller 13 may be based on integrated circuitry, discrete components, or a combination of the two. In an embodiment, the controller 13 is implemented via a computerized device such as a PC, laptop computer, or integrated machine computer which may be configured to serve the functions of controller 13 as well as numerous other machine functions. In an alternative embodiment, the controller 13 is a dedicated module. In such a case, the controller 13 may be a processor-based device or collection of devices. In an embodiment, the controller 13 is implemented via an electronic control module (ECM).

Regardless of how it is implemented, the controller 13 operates, in an embodiment, by executing computer-executable instructions read from a nontransitory computer-readable medium such as a read only memory, a random access memory, a flash memory, a magnetic disc drive, an optical disc drive, and the like. In addition to these instructions, the data processed by the controller 13 may be read from memory in addition to being obtained from one or more of the various machine inputs. The memory may reside on the same integrated circuit device as the processor of the controller 13 or may alternatively or additionally be located separately from the controller 13.

While the controller 13 and its various inputs and outputs will be described by way of a spoke and hub architecture, it will be appreciated that any suitable bus type may be used. For example, inputs and outputs may be serially multiplexed by time or frequency rather than being provided over separate connections. It will be appreciated that peripheral circuitry such as buffers, latches, switches and so on may be implemented within the controller 13 or separately as desired. Because those of skill in the art will appreciate the usage of such devices, they will not be further described herein. As noted above, the controller 13 receives a number of inputs or input signals. In the illustrated embodiment, the controller 13 is shown receiving a GPS input 14, a pitch input 15, and a roll input 16. The GPS input 14 may provide location data containing an indication of a current location of the machine. Such data may be derived from a GPS module 18. It will be appreciated that the GPS module 18 may be integrated with the control or data systems of the machine or may be a separate unit.

The pitch input 15 provides data containing an indication of the current pitch angle of the machine. Pitch angle typically references the angle between a level surface and the machine axis in the direction of travel. By way of example, the data containing the indication of the current pitch angle may be derived from a pitch sensor module 19. The pitch sensor module, which may be integrated with the machine data or control systems or may be a separate module, may measure the pitch of the tracks or other undercarriage of the machine or may measure the pitch of the machine cab. Pitch may be measured via a gravitational sensor or other internal or external means for detecting an amount of divergence from a level attitude.

Similar to the pitch input 15, the roll input 16 provides data indicative of a degree of roll of the machine (roll angle). The roll angle typically measures the angle between a level surface and the machine axis perpendicular to the direction of travel, and may be obtained from or derived by a roll sensor module 20. The roll sensor module 20, which may be an integrated or separate component in the same manner as the pitch sensor module 19, may measure the roll angle of the undercarriage or of the cab depending upon the implementation desired. Measurement of the roll angle may be made via a gravitational sensor or other internal or external means as noted above with respect to the measurement of the pitch angle.

In an embodiment, the controller 13 provides a data output to a network gateway 21 such as an Ethernet gateway. The network gateway 21 is responsible for linking the network upon which the controller 21 operates (e.g., a datalink network) to another network upon which a video encoder 22 resides (e.g., an Ethernet network).

The video encoder 22 is in turn linked to a plurality of video cameras including, for example, a first video camera 23, a second video camera 24, a third video camera 25, and a fourth video camera 26. In an embodiment, the video cameras 23, 24, 25, 26 are digital video cameras. In a further embodiment, the first video camera 23 is directed to the front of the machine, to capture video of the terrain toward which the machine is travelling as well as the position of a forward-placed implement or tool, such as a blade. The second video camera 24 is directed to the rear of the machine, to capture video of the terrain, objects, and/or personnel that the machine may travel towards if operated in reverse. The third video camera 25 is directed to the front left of the machine, and the fourth video camera 26 is directed to the front right of the machine. In addition, a number of site cameras may provide video of a machine from an external vantage point on the site.

In order to transmit video and machine data off board to the remote operator center 2, the video encoder 22 is linked to a network encoder 27. The network encoder 27 packages the outgoing data in accordance with the appropriate network protocol, e.g., Ethernet, and similarly unpacks incoming data based on the same protocol. The network encoder 27 communicates wirelessly via a wireless transmitter 28.

At the remote operator center 2, an operator center architecture 30 is configured to receive video and machine data from each machine, and to provide the received information to the operator as shown in the schematic diagram of FIG. 3. The operator center architecture 30 is also configured to generate information for transmission to the remote machines, e.g., control commands, video commands, and so on.

In an embodiment, the operator center architecture 30 includes a supplemental server 31, which may include a computing device such as a personal computer, laptop computer, computing console, or other computing device. The supplemental server 31 is responsible, in an embodiment, for generating supplemental content such as e-fencing (virtual machine boundaries) and virtual imagery. The supplemental server 31 may also be used for certain administrative tasks, such as cycle planning and the like, e.g., for coordinating passes with a slot.

The supplemental server 31 is linked to a router or switch 32. The switch 32 serves to link several portions of the operator center architecture 30 together as well as to link these components to the wireless network. Thus, in an embodiment, the switch 32 is also linked to an operator station 33, a vision system 34, and a network encoder 35.

The network encoder 35 of the operator center architecture 30 may be similar to the network encoder 25 of the machine data and control system 10 as described above with respect to FIG. 3. That is, the network encoder 35 of the operator center architecture 30 may package outgoing data in accordance with the appropriate network protocol, e.g., Ethernet, and unpack incoming data based on the same protocol.

The network encoder 35 is linked to, and communicates wirelessly via, a wireless transmitter 36. As with the wireless transmitter 26 of the machine data and control system 10, the wireless transmitter 36 of the operator center architecture 30 may be a relatively long range transmitter capable of communicating with remote machines.

The operator station 33 is configured to receive operator inputs and to allow certain program configuration actions such as the setting of default values and so on. The operator station 33 includes, in an embodiment, one or more operator controls 37. The operator controls 37 may include one or more joystick control systems 38 as well as one or more switches or buttons 39 for braking, acceleration, etc. Each joystick control system 38 may include a plurality of selectable switches, sliders, and/or buttons that may be selected to affect machine operations.

In a further embodiment, the operator station 33 includes a controller console 40. The controller console 40 is a computing device such as a personal computer, laptop computer, computing console, or other computing device. The role of the controller console 40 is to execute instructions or code configured to apply a prioritization algorithm to the available video information based on available machine information and to specify video appearance and/or position to the vision system, discussed below, based on the result of the prioritization algorithm.

As noted above, the operator center architecture 30 also includes a vision system 34. In an embodiment, the vision system 34 includes a computing device 41 linked to one or more display screens 42. In an embodiment, the computing device 41 is a computer such as a personal computer. The computing device 41 is configured to convert received video data into a displayable form for display by the one or more display screens 42. In an embodiment, the one or more display screens 42 include a display associated with the computing device 41. Moreover, while the one or more display screens 42 are configured to display material to an operator, the one or more display screens 42 may also receive user input via a touch screen mechanism in an embodiment.

Figure 4:
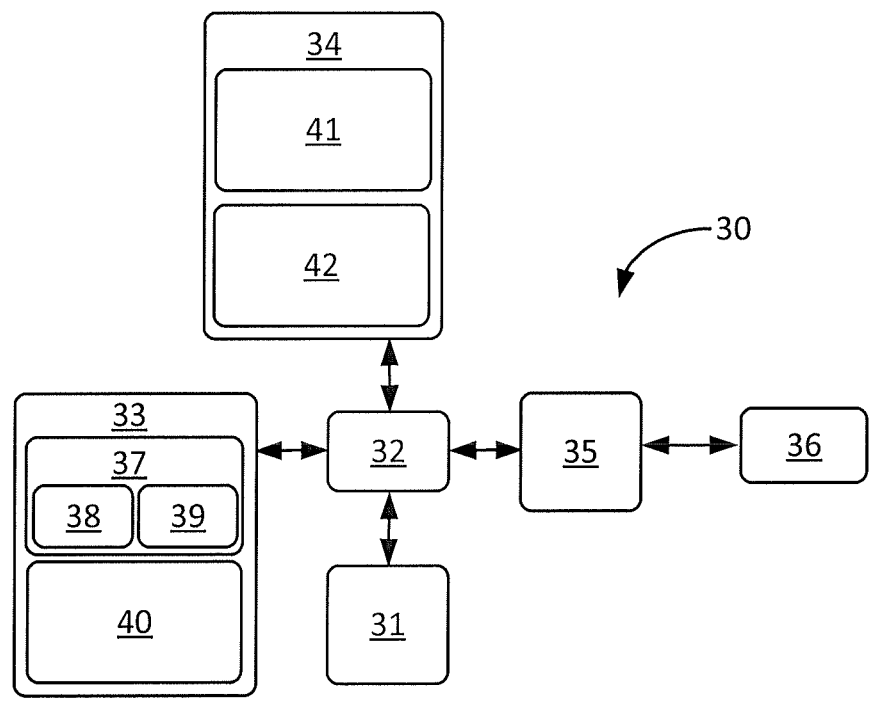
FIG. 4 is a schematic diagram of an operator center architecture in accordance with an aspect of the disclosure.

During the remote control or monitoring of one or more machines equipped as discussed above with respect to FIG. 3 via an operator center architecture 30 configured as described with respect to FIG. 4, the computing device 41 drives the one or more display screens 42. In particular, the computing device 41 generates a live video image based on the data received from the onboard video cameras 21, 22, 23, 24.

In an embodiment, in order to increase or decrease the visibility of video information based on the current urgency of the information, the controller console 40 applies adaptive real time video control to execute video display modification based on machine operational parameters such as machine speed, machine location, machine implement operation and machine direction. As noted above, such modifications to the video display may include modifying a position of one or more video displays, modifying an overlay color for one or more video displays, modifying an outline color for one or more video displays, or modifying a display rate for one or more video displays. The modifications so made are configured to enhance operator focus on higher priority video displays.

Figure 5:
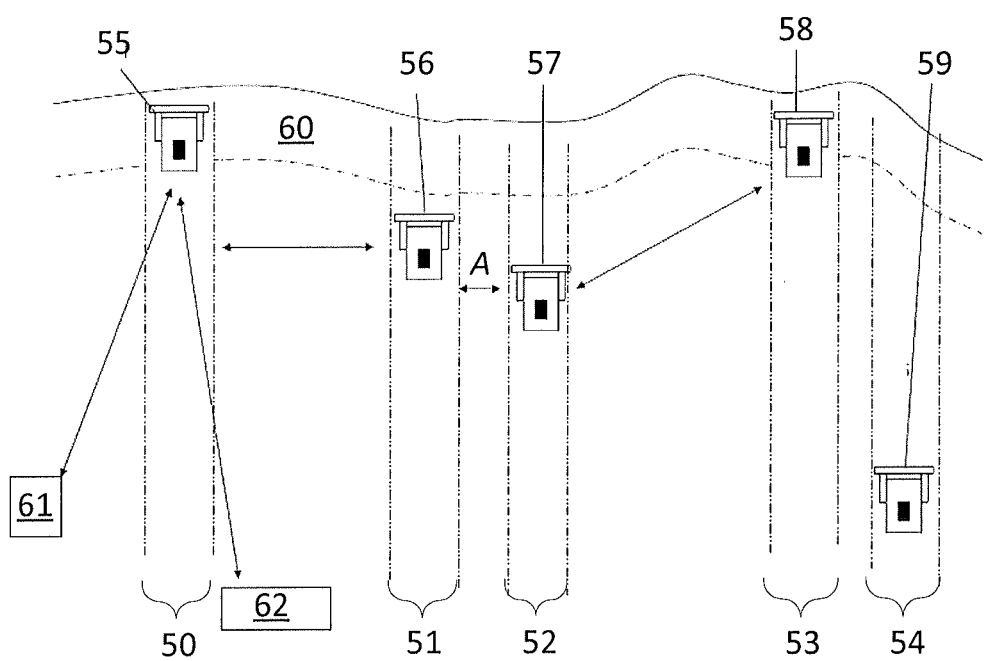
FIG. 5 is a schematic site diagram showing a work site and associated machines and objects within which aspects of the disclosure may be implemented.

In an embodiment, the prioritization of video displays considers a number of factors, examples of which will be discussed. It will be appreciated that the prioritization in any specific implementation may consider additional and/or alternative factors. For purposes of providing several examples of conditions factored into video prioritization, FIG. 5 is a schematic site illustration showing certain site features and multiple machines being remotely controlled or remotely monitored.

The illustrated site includes a work site undergoing a slot dozing operation, wherein each dozer cuts and clears a given slot or area of the site before moving to the next. A dozer may make multiple passes within a slot to finish it. Typically slots being worked simultaneously are oriented parallel to one another. The illustrated site includes a first slot 50, a second slot 51, a third slot 52, a fourth slot 53, and a fifth slot 54. Each slot 50, 51, 52, 53, 54 holds at least one machine, with five machines being shown including a first machine 55, a second machine 56, a third machine 57, a fourth machine 58 and a fifth machine 59. The illustrated site also includes a crest region 60, as well as two objects including a first object 61 and a second object 62.

When multiple machines are being remotely monitored by an operator, the operator can typically actively control only one machine at a time. Thus, the video feeds associated with the controlled machine may be displayed centrally, while the machines being monitored may have their video feeds, or a subset thereof, displayed via a sequence of miniature display portions. When the operator switches to control another machine, the primary video display may also switch accordingly to show the video feeds of the second machine. Continuing with the illustrated example, the controller console 40 prioritizes the miniaturized video displays for more or less prominent display based on several factors, including, for example, (1) proximity to objects or hazards; (2) proximity to other machines or personnel; (3) proximity to boundaries; (4) location within a slot; (5) machine status (transmission status, forward, reverse, etc., machine speed, load); (6) operational factors such as depth of slot, current cut, cut location; (7) operator selection of priority among work areas (when multiple work areas are active,); (8) material type; (9) slope or terrain specifics; and/or (10) time since last viewing.

Based on these criteria, a prioritization factor is assigned to each machine, which dictates the indicators, highlights, and/or position of the associated video displays. For example, in the illustrated site of FIG. 5, each of slots 50, 51, 52, 53, 54 has a machine 55, 56, 57, 58, 59 associated therewith. For the sake of example, we assume that the first machine 55 is moving forward towards the crest, and is within the crest region 60. In an embodiment, the first machine 55 is accordingly assigned the highest priority. Assume that the fourth machine 58 is also within the crest region 60, but is operating in reverse, moving away from the crest; as such, the fourth machine 58 may be assigned a lower priority than that of the first machine 55.

Those of skill in the art will appreciate that there are various ways in which the crest region 60 may be determined. For example, the position of the crest may be periodically updated by operator input. In connection with this embodiment, the operator may be periodically prompted to update the position of the crest. Alternatively, the position of the crest may be automatically updated based on actuator pressure and position information from a GPS/IMU. The crest region 60 may then be determined by providing a boundary at a particular distance from the crest for example.

In the illustrated example, each of the machines 55, 56, 57, 58, 59 is separated by a distance from each of the other machines. For example, the second machine 56 and the third machine 57 are operating in adjacent slots 51, 52, at positions where they are within a distance A of each other. Given this proximity, which is closer than the proximity of any other machine pair, the second machine 56 and the third machine 57 are accorded higher proximity-based priority than any other machine.

It will be appreciated that the prioritization factors may themselves be ranked according to priority. For example, priority accorded based on a machine's location within the crest region 60 may be given greater weight than priority based on machine proximity to another machine, or the opposite may be true. That said, it will be appreciated that some or all factors may be of equal weight without departing from the scope of the disclosed principles.

As noted above, priority may also be accorded based in part on the proximity of a machine to one or more objects on the site, e.g., fixed structures such as existing buildings, machine sheds, machine control centers, etc. This may be coupled with information regarding the machine's direction to derive a priority value. In the illustrated example, the first machine 55 is operating in proximity to the first object 61 and the second object 62. In particular, the respective distances from the first machine 55 to the first object 61 and the second object 62 are B and C respectively. Assuming, for example, that the first machine 55 is in reverse and heading toward these objects 61, 62, the first machine 55 may be provided a higher priority.

As another example of a prioritization factor, the material in which a machine is operating may be used to calculate machine priority. For example, if the fourth machine 58 and the fifth machine 59 are operating in a material that is more difficult with respect to control, e.g., in gravel as opposed to packed earth, these machines 58, 59 may be given priority based on the material.

Once the various prioritization factors are considered, and taking into account any ranking among the prioritization factors, an overall prioritization ranking is assigned to each machine 55, 56, 57, 58, 59. This overall prioritization ranking is then used to adapt the vision system video display, including the display associated with each machine, to emphasize the video displays associated with higher priority machines. As noted above, modifications to the display may include modifying video placement, coloring, outline, display rate, etc.

For example, the machine with the highest priority that is not a current active machine may have the video display associated with that machine highlighted red for the highest priority, yellow for the second highest priority, etc. As an alternative, a colored and/or shaped indicator may indicate priority. To accommodate color-blind operators, a non-colored indicator may be used. An example of this includes flashing or shaking the video display portion of interest.

In addition to modifications applied to the video displays in-place, the position or orientation of a video display may alternatively or additionally be changed. For example, a video display associated with the highest priority machine that is not currently active may be colored red and moved to a top position amongst the video displays. A video display associated with the next highest priority machine may be placed second in the hierarchy of displays and may be colored yellow for example.

In some systems, instead of a plurality of video displays being presented for the non-active machines, the vision system may include a single display that cycles through the video displays associated with the non-active machines. In this embodiment, the frequency and/or duration of presentation of a video display(s) associated with any specific machine may be based on the calculated overall priority of the machine. It will be appreciated by those of skill in the art that this approach is applicable to remote vision systems wherein there are fewer display regions than there are video feeds associated with machines being controlled/monitored.

Figure 6:
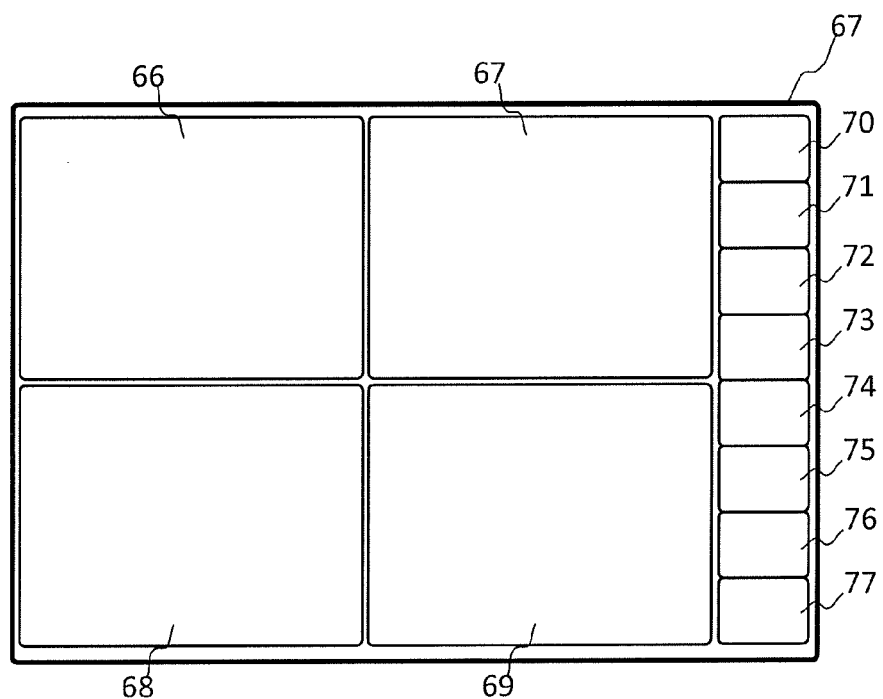
FIG. 6 is a schematic screen view representation of a display screen in the remote operator center in accordance with an aspect of the disclosure.

Before discussing the prioritization and display process in greater detail, a brief example of a basic display arrangement is given. In this connection, FIG. 6 is a simplified schematic illustration of video display arrangement associated with a remote vision system for machine monitoring and control. In the illustrated example, four video displays associated with a machine currently being remotely controlled are shown centrally on an operator display 65. As shown, the four video displays associated with the machine being remotely controlled are placed in four adjacent quadrants 66, 67, 68, 69 of the display 65. In addition, a subset of video feeds, such as direct front or rear views, may be shown for some or all other machines being monitored via miniature displays 70, 71, 72, 73, 74, 75, 76, 77.

As briefly noted above, the order of the miniature displays 70, 71, 72, 73, 74, 75, 76, 77 may be altered and/or the appearance of certain video displays may be modified to indicate a priority associated with the machine from which the video display originates. In the event that video displays are dispersed sequentially in time rather than spatially over the display 65, the order, frequency, and or duration of one or more video displays may be modified based on machine priority. In the following discussion, examples of the prioritization and display process are given, with the understanding that other implementations will be apparent to the reader of ordinary skill in the art.

In the embodiment discussed below with respect to FIGS. 6-7, the controller console 40 carries out the process of prioritization. However, the task of prioritization may alternatively be shared with another computing device or may be delegated entirely to one or more other computing devices.

INDUSTRIAL APPLICABILITY

In general terms, the present disclosure sets forth a system and method applicable to earth-moving machines and other industrial machines used in remote control/monitoring applications such as in mining applications wherein it is desired to provide a remote operator with video information regarding controlled and monitored machines. The disclosed system provide adaptive real time video control to allow for video display modification based on machine operational parameters (machine speed, machine location, machine implement operation, machine direction, machine proximity to other entities, and so on.). Modifications to the video display may, for example, include modifying the position of one or more displays, the overlay color of one or more displays, the outline color of one or more displays, or the display rate of one or more displays in order to enhance operator focus on higher priority video displays as discussed above.

Figure 7:
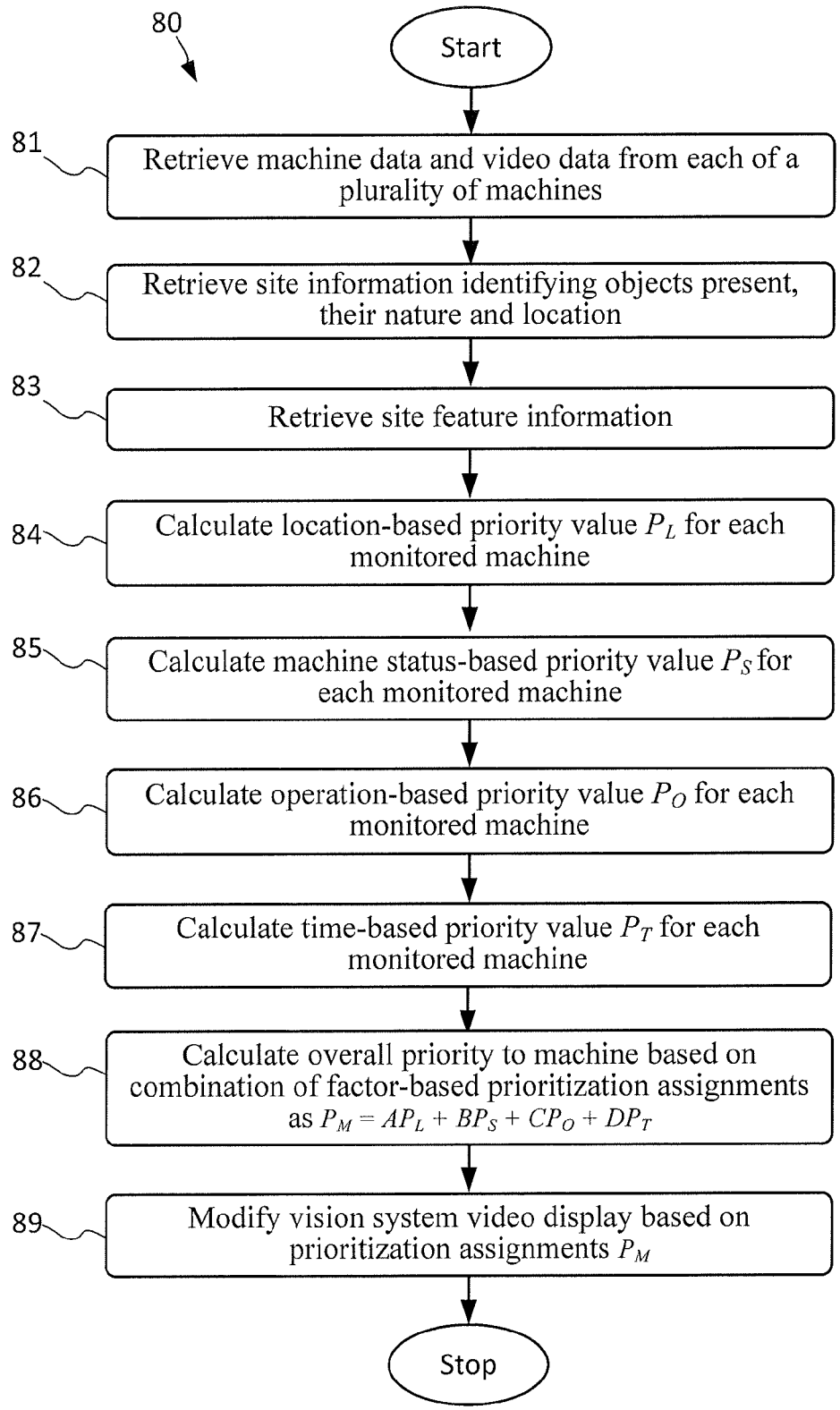
FIG. 7 is a flow chart of a process for creating a machine priority ranking in accordance with an aspect of the disclosure.

An example prioritization process flow is illustrated via the flow chart 80 of FIG. 7 with reference to the architectures of FIGS. 1-3, the example site of FIG. 5, and the display elements of FIG. 6. The illustrated process describes steps taken at the operator center 2 and at one or more of the remote machines 3, 4, 5, 6. It will be appreciated that certain steps may be executed at the operator center 2 or at one or more of the machines 3, 4, 5, 6, and in some instances a location for such steps will be identified. This is not meant to imply that other steps may not also be executed at one or more machines instead, depending upon implementation preferences, or that a step described as occurring at a machine 3, 4, 5, 6 cannot instead take place at the operator center 2.

In the illustrated embodiment, the process 80 begins at stage 81, wherein the controller console 40 retrieves machine data and video data from each of a plurality of machines, including all machines being monitored but not actively controlled by the operator. The machine data may include, for example, machine location, machine position along a slot, material being worked by the machine, machine speed and travel direction, machine transmission status, and machine implement pressure and position.

At stage 82, the controller console 40 retrieves or accesses site information, e.g., identifying objects present on the site and their nature and location. For example, objects present on the site may include personnel, buildings, infrastructure objects, and so on. Continuing, the controller console 40 retrieves site feature information at stage 83, the site feature information including, for example, the locations of any identified special zones, e.g., a crest zone. In an embodiment wherein a plurality of work areas are active, the operator may provide a selection of priority among the work areas.

From the retrieved machine data, the controller console 40 derives multiple priority values for each monitored machine based on multiple factors, and then determines an overall priority value for each such machine. Thus, for example, at stage 84 of the process 80, the controller console 40 calculates a location-based priority value $P_L$ for each monitored machine. Similarly, at stage 85, the controller console 40 calculates a machine status-based priority value $P_S$ for each monitored machine. The calculation of the status-based priority value $P_S$ may take into account machine speed and direction of travel as well as transmission status and load.

The controller console 40 may then calculate a machine operation-based priority value $P_O$ at stage 86, e.g., placing a higher priority on machines operating in materials that increase the difficulty of machine control, such as gravel or sand, and a lower priority on machines operating in material that provides easier machine control, e.g., packed earth. Factors such as depth of slot, current cut, cut location, slope or terrain specifics and related parameters are also accounted for at this stage in the priority decision in calculating the operation-based priority value $P_O$.

Finally, a time-based priority value $P_T$ is calculated at stage 87, taking into account, for example, the time since a particular machine has been affirmatively steered or operated. For example, the time-based priority value $P_T$ may be a normalized value inversely proportional to the time elapsed, such that in general, machines more recently manipulated may be assigned a lower priority than machines that have not been manipulated for a longer period of time.

At stage 88, the controller console 40 assigns an overall priority to each machine based on the combination of individual factor-based prioritization assignments for that machine, including, for example, the factors discussed above. The combination may include any suitable process of combination, and in an embodiment, a linear weighted combination is employed. Such a combination may define the overall machine priority $P_M$ for a particular machine, then, as $P_M = AP_L + BP_S + CP_O + DP_T$ where the parameters A, B, C and D are weighting factors configured to emphasize certain priorities, e.g., $P_L$, over other priorities, e.g., $P_O$. The set of overall machine priorities for all machines being monitored is referred to herein as a priority ranking.

Having ranked the machines according to their respective overall priorities $P_M$, the controller console 40 then modifies the video display of the vision system 34 to accentuate at least a highest priority machine or group of highest priority machines to the operator at stage 86. For example, at stage 86, the controller console 40 may order the miniature displays 70, 71, 72, 73, 74, 75, 76, 77 from top (highest) to bottom (lowest) based on overall priority for each monitored but not currently actively controlled machine. Additionally or alternatively, the controller console 40 may modify the display by highlighting certain video displays via an overlay, outline, blinking or other temporal effect, duration of display, etc., as discussed above.

It will be appreciated that certain factor-based prioritizations may be comprised of several individual factor evaluations. For example, the calculation of the location-based priority value $P_L$ for each monitored machine may take into account the locations of other machines on site, the locations of objects on site, the location of predefined or operator-defined zones, and so on.

Figure 8:
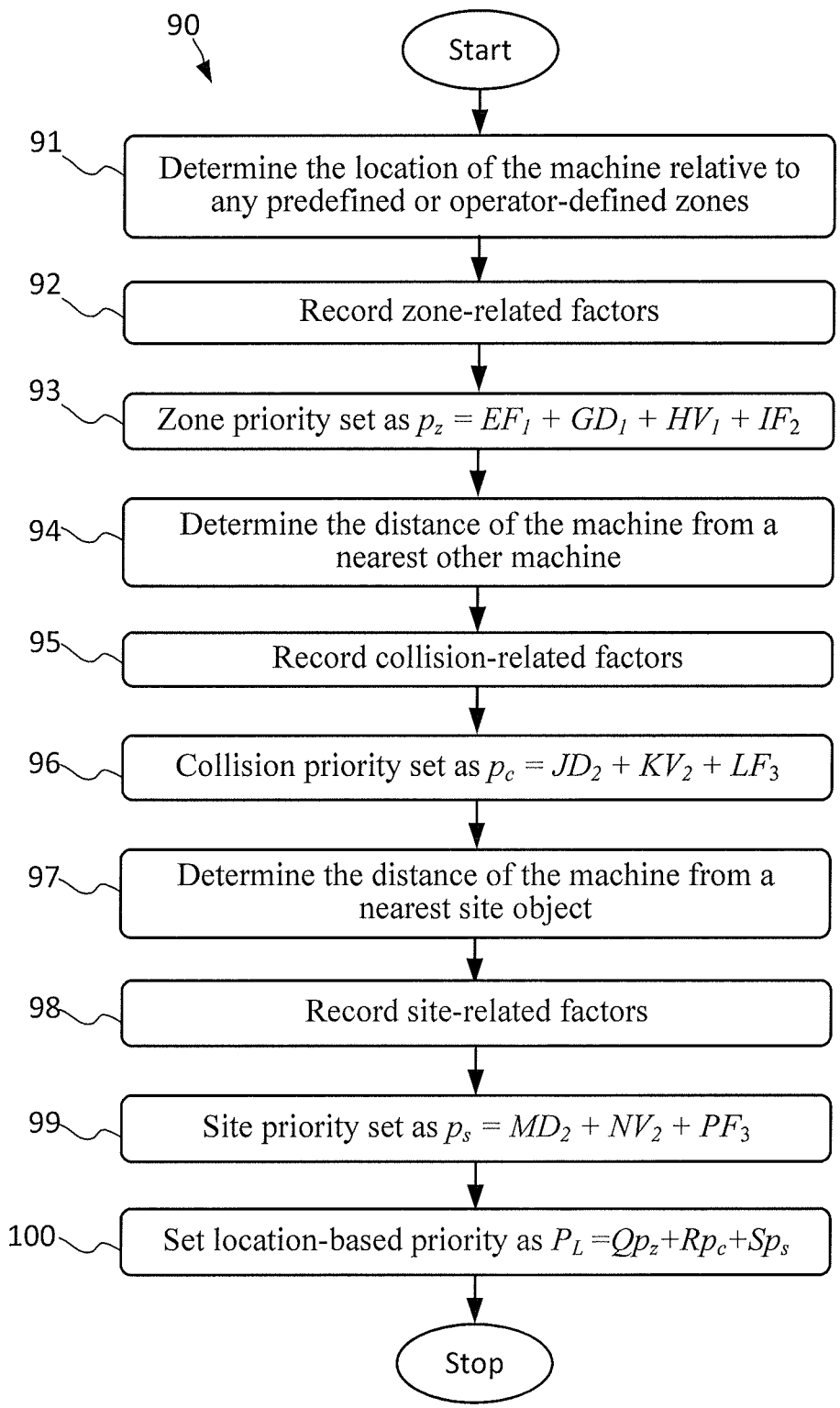
FIG. 8 is a flow chart of a process for deriving a location-based priority value in accordance with an aspect of the disclosure.

The flowchart of FIG. 8 illustrates a process 90 for deriving a location-based priority value $P_L$ for a monitored machine in accordance with an aspect of the disclosure. It will be appreciated that the precise use and weighting of factors in this process 90 are given as examples, and accordingly, the location-based priority value $P_L$ may be derived in a different manner, based on the same factors or other additional or alternative factors and weightings.

At stage 91 of the process 90, the controller console 40 determines the location of the machine relative to any pre-defined or operator-defined zones such as crest zones, work zones, etc. At stage 92, the controller console 40 records a number of zone-related factors including whether the machine is in such a zone (binary flag $F_1$), and the distance from the zone if the machine is outside the zone (value $D_1$), as well as the speed (value $V_1$) and relative direction (binary flag $F_2$, towards or away from the zone) of the machine in this case as well. In this way, if the machine is within such a zone, or is within a distance $D_1$ of the boundary of such a zone and moving toward the zone, the controller console 40 sets a higher zone priority $p_z$ for the machine. Accordingly, at stage 93, the zone priority $p_z$ may be established for example via a linear relationship such as $p_z = EF_1 + GD_1 + HV_1 + IF_2$ wherein E, G, H, and I are scaling factors.

At stage 94 of the process 90, the controller console 40 determines the distance of the machine from a nearest other machine. At stage 95, the controller console 40 then records a number of collision-related factors including the distance of the machine from the nearest other machine ($D_2$), the machine speed (value flag $V_2$) and relative direction (binary flag $F_3$) of the machine. In this way, if the machine is within a distance $D_2$ of the nearest other machine and moving toward that nearest other machine, the controller console 40 sets a higher collision priority $p_c$ for the machine. Thus at stage 96, the collision priority $p_c$ may be established for example via a linear relationship such as $p_c = JD_2 + KV_2 + LF_3$ wherein J, K, and L are scaling factors.

At stage 97 of the process 90, the controller console 40 determines the distance of the machine from a nearest site object. At stage 98, the controller console 40 then records a number of site-related factors including the distance of the machine from the nearest site object ($D_3$), the machine speed (value flag $V_3$) and relative direction (binary flag $F_4$) of the machine. Thus, for example, if the machine is within a distance $D_3$ of the nearest site object and moving toward that object, the controller console 40 sets a higher site priority $p_s$ for the machine. At stage 99, the site priority $p_s$ may be established for example via a linear relationship such as $p_s = MD_2 + NV_2 + PF_3$ wherein M, N, and P are scaling factors.

At stage 100, the controller console 40 calculates the location-based priority value $P_L$ for the machine in question by a weighted combination of the zone priority $p_z$, collision priority $p_c$, and site priority $p_s$. Thus, for example, the location-based priority value $P_L$ for the machine in question may be established by a linear combination such as: $P_L = Qp_z + Rp_c + Sp_s$.

It will be appreciated that the present disclosure provides a system and method for facilitating remote operator visualization and control of a machine. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for providing remote vision to a remote operator with respect to a plurality of machines, the system comprising:
   a remote vision system including one or more display screens;
   a receiver for receiving video information and machine information from each of the plurality of machines;
   a controller console linked to the remote vision system and the receiver, configured to calculate a priority ranking of the plurality of machines based on the received machine data and to display the received video information from each machine as one or more video displays on one or more of the display screens such that at least one of the one or more video displays associated with a particular machine is visually modified based on the priority ranking.

2. The system in accordance with claim 1, wherein the controller console is configured to visually modify the at least one of the one or more video displays associated with the particular machine by generating a colored overlay for display over the one or more video displays.

3. The system in accordance with claim 1, wherein the controller console is configured to visually modify the at least one of the one or more video displays associated with the particular machine by generating a colored outline for display around the one or more video displays.

4. The system in accordance with claim 1, wherein the controller console is configured to visually modify the at least one of the one or more video displays associated with the particular machine by modifying a position of the one or more video displays on the display screen.

5. The system in accordance with claim 1, wherein the controller console is configured to present the one or more video displays as a visual series on the display screen, and wherein modifying the at least one video display includes moving a position of the at least one video display in the visual series.

6. The system in accordance with claim 1, wherein the controller console is configured to present the one or more video displays periodically as a temporal series on the display screen, and wherein modifying the at least one video display includes modifying a duration for which the at least one video display is shown in the series.

7. The system in accordance with claim 1, wherein the controller console is configured to present the one or more video displays periodically as a temporal series on the display screen, and wherein modifying the at least one video display includes modifying a frequency at which the at least one video display is shown in the series.

8. The system in accordance with claim 1, wherein the priority ranking of the plurality of machines prioritizes machines based on one or more of a machine location relative to one or more zones, a machine location relative to one or more other machines, a machine location relative to a slot occupied by the machine, and a machine location relative to one or more objects on a work site occupied by the machine.

9. The system in accordance with claim 8, wherein the one or more zones include a crest zone defining a crest on the work site.

10. The system in accordance with claim 8, wherein the one or more objects on the work site include one or more of a person, a building, and a structure.

11. The system in accordance with claim 8, wherein the priority ranking of the plurality of machines further prioritizes machines based on one or both of their direction and speed of travel.

12. The system in accordance with claim 1, wherein the priority ranking of the plurality of machines prioritizes machines based on one or more of a machine load, depth of a slot occupied by the machine, a current cut, the current cut location, a material type at the machine location, and a terrain slope at the machine location.

13. The system in accordance with claim 1, wherein the priority ranking of the plurality of machines prioritizes machines based on a time that has elapsed since a video display associated with each machine has been displayed.

14. A method of providing remote vision to an operator of a plurality of machines, the method comprising:
   receiving video data and machine data from each of the plurality of machines;
   prioritizing the plurality of machines based on the machine data for each machine to create a priority ranking; and
   displaying the received video data on a display screen as a plurality of video displays, each video display being associated with one machine, such that the plurality of video displays are displayed in accordance with the priority ranking of the machines.

15. The method of providing remote vision in accordance with claim 14, wherein displaying the received video data in accordance with the priority ranking comprises setting a characteristic of one or more video displays in accordance with the priority ranking, the characteristic being selected from the group consisting of a colored overlay, a colored outline a position in a visual series, a frequency of display, and a duration of display.

16. The method of providing remote vision in accordance with claim 14, wherein the priority ranking prioritizes machines based on one or more of a machine location relative to one or more zones, a machine location relative to one or more other machines, a machine location relative to a slot occupied by the machine, and a machine location relative to one or more objects on a work site occupied by the machine.

17. The method of providing remote vision in accordance with claim 16, wherein the one or more zones include a crest zone defining a crest on the work site.

18. The method of providing remote vision in accordance with claim 16, wherein the one or more objects on the work site include one or more of a person, a building, and a structure.

19. The method of providing remote vision in accordance with claim 14, wherein the priority ranking prioritizes machines based on one or more of machine direction, machine speed of travel, machine load, depth of a slot occupied by the machine, a current cut, the current cut location, a material type at the machine location, a terrain slope at the machine location, and a time that has elapsed since a video display associated with each machine has been displayed.

20. A non-transitory computer readable medium having thereon computer-executable instructions for providing remote vision to an operator of a plurality of machines, the computer-executable instructions comprising:
   instructions for receiving video data and machine data from each of the plurality of machines;
   instructions for prioritizing the plurality of machines based on the machine data for each machine to create a priority ranking; and
   instructions for displaying the received video data on a display screen as a plurality of video displays, each video display being associated with one machine, such that the plurality of video displays are displayed in accordance with the priority ranking of the machines.

* * * * *